United States Patent
Tamura et al.

(10) Patent No.: US 11,782,461 B1
(45) Date of Patent: Oct. 10, 2023

(54) FLOW RATE CONTROL DEVICE

(71) Applicant: TOFLO CORPORATION, Tokyo (JP)

(72) Inventors: Fumikazu Tamura, Tokyo (JP); Shinji Tobimatsu, Tokyo (JP); Masatoshi Nakamura, Tokyo (JP); Kenji Yamamoto, Tokyo (JP)

(73) Assignee: TOFLO CORPORATION, Tokyo (JP)

( * ) Notice: Subject to any disclaimer, the term of this patent is extended or adjusted under 35 U.S.C. 154(b) by 0 days.

(21) Appl. No.: 18/144,599

(22) Filed: May 8, 2023

(30) Foreign Application Priority Data

May 16, 2022 (JP) .................. 2022-080424

(51) Int. Cl.
  *G05B 19/00* (2006.01)
  *G05D 7/06* (2006.01)
  *G05B 19/416* (2006.01)

(52) U.S. Cl.
  CPC ......... *G05D 7/0623* (2013.01); *G05B 19/416* (2013.01); *G05D 7/0635* (2013.01); *G05B 2219/37333* (2013.01); *G05B 2219/37371* (2013.01)

(58) Field of Classification Search
  CPC .. G05D 7/0623; G05D 7/0635; G05B 19/416; G05B 2219/37371; G05B 2219/37333
  USPC ......................................................... 700/282
  See application file for complete search history.

(56) References Cited

U.S. PATENT DOCUMENTS 7,069,944 B2 * 7/2006 Morikawa ............ G05D 7/0635
                                              700/282
2020/0284627 A1 * 9/2020 Kawamoto ............ G01F 1/1155

FOREIGN PATENT DOCUMENTS

| CN | 111788534 A | * | 10/2020 |
| EP | 0110325 A1 | * | 6/1984 |
| JP | H09-217898 A | | 8/1997 |
| JP | 6348858 B2 | * | 6/2018 |
| KR | 2012-0122155 A | * | 11/2012 |
| KR | 10-1842160 B1 | * | 3/2018 |
| WO | 2019/163676 A1 | | 8/2019 |

* cited by examiner

*Primary Examiner* — Hien D Khuu
(74) *Attorney, Agent, or Firm* — Bridgeway IP Law Group, PLLC; Sang Ho Lee; Hyun Woo Shin

(57) ABSTRACT

Provided is a flow rate control device capable of improving accumulated flow rate error. The flow rate control device of the present disclosure includes: a flow rate meter that measures a flow rate of a fluid flowing through a flow path; a flow rate regulating valve that regulates the flow rate of the fluid flowing through the flow path; and a control part that controls an opening degree of the flow rate regulating valve based on a measurement result of the flow rate meter, includes: a closing function that controls the opening degree of the flow rate regulating valve with an instantaneous flow rate value and closes with a set accumulated flow rate value; and an accumulated value prediction function that monitors the current opening degree of the flow rate regulating valve and the instantaneous flow rate value all the time, and starts a closing operation of the flow rate regulating valve at a time point when the accumulated flow rate value reaches an early closing flow rate value.

2 Claims, 9 Drawing Sheets

| Current Opening Degree (%) | Fully Closing Completion Time [ms] | The case in which instantaneous flow rate is 300mL/min and accumulated flow rate value is 1000mL | | The case in which instantaneous flow rate is 1000mL/min and accumulated flow rate value is 1000mL | |
|---|---|---|---|---|---|
| | | Delay Flow Rate Value (mL) | Early Closing Flow Rate Value (mL) | Delay Flow Rate Value (mL) | Early Closing Flow Rate Value (mL) |
| 0 | 0 | - | - | - | - |
| 10 | 36 | 0.18 | 999.82 | 0.59 | 999.41 |
| 20 | 72 | 0.36 | 999.64 | 1.19 | 998.81 |
| 30 | 99 | 0.49 | 999.51 | 1.64 | 998.36 |
| 40 | 115 | 0.57 | 999.43 | 1.90 | 998.10 |
| 50 | 132 | 0.66 | 999.34 | 2.19 | 997.81 |
| 60 | 159 | 0.79 | 999.21 | 2.63 | 997.37 |
| 70 | 180 | 0.90 | 999.10 | 2.98 | 997.02 |
| 80 | 206 | 1.03 | 998.97 | 3.41 | 996.59 |
| 90 | 240 | 1.20 | 998.80 | 3.98 | 996.02 |
| 100 | 300 | 1.50 | 998.50 | 4.98 | 995.02 |

FIG. 5

FLOW RATE CONTROL DEVICE

CROSS-REFERENCE TO RELATED APPLICATION

This application claims priority to and the benefit of Japanese Patent Application No. 2022-080424 filed on May 16, 2022, the entire contents of which are incorporated herein by reference.

TECHNICAL FIELD

The present application relates to a flow rate control device capable of controlling with an instantaneous flow rate value and of closing a valve with an accurate accumulated flow rate value.

BACKGROUND

In the past, a flow rate control device including a flow rate meter, a flow rate regulating valve, and a controller is known. In such a flow rate control device, in the case of closing the valve with the accumulated flow rate value, a method, which first keeps the instantaneous flow rate value constant and then closes the valve at the time point when the accumulated flow rate value was reached, is usually adopted. However, since the valve cannot be closed in an instant, it takes time until the valve is closed even after the accumulated flow rate value was reached, resulting in an accumulated flow rate value error due to the required time. Particularly, in the case where one valve functions as both a flow rate regulating valve and a close valve, the time until the value is closed will be even more needed, therefore the accumulated flow rate value error will become larger.

In addition, since the opening degrees controlled by the following pressure conditions and the instantaneous control flow rate are different, the accumulated flow rate error is different according to the valve opening degree even for a same instantaneous control flow rate, and there is a problem that it is difficult to close the valve with an accurate accumulated flow rate value. It should be noted that when the pressure condition changes, there are also problems such as the change of accumulated flow rate error and poor reproducibility.

Pressure condition: if the pressure is large, then the discharge quantity becomes more, if the pressure is small, then the discharge quantity becomes less.

Instantaneous control flow rate: if the instantaneous control flow rate is more, then the valve opening is larger, if the instantaneous control flow rate is less, then the valve opening is smaller.

The injection amount control device of Patent Document 1 is configured to predict the arrival time of the accumulated flow rate and control by starting a closing operation in advance of the valve closing operation time so as to achieve an accurate injection amount, however, since the valve will be closed during a constant time and the instantaneous flow rate is not controlled, the instantaneous flow rate value is different according to the pressure condition. In addition, the technique is different from the present disclosure in the absence of feedback from an opening sensor or the like and in the absence of instantaneous flow rate control.

PRIOR ART DOCUMENT

Patent Document

Patent Document 1: Japanese Patent Application Laid-Open 2002-310773 (Toshiba Ltd)

SUMMARY

Technical Problem

The present disclosure is made in view of the above-mentioned problem, and its object is to provide a flow rate control device which is capable of improving accumulated flow rate error regarding delay time when closing a valve, by considering that the deviation of accumulated over flow rate value occurs because the opening area in valve controlling (valve height=valve opening degree) is different according to the pressure change and the instantaneous control flow rate value, monitoring the valve opening and the instantaneous flow rate value all the time and closing the valve in advance at an appropriate time (the time matching the control flow rate value and the opening value).

Technical Solution

In order to solve the above-mentioned problem, the flow rate control device of the present disclosure is characterized by comprising: a flow rate meter that measures a flow rate of a fluid flowing through a flow path; a flow rate regulating valve that regulates the flow rate of the fluid flowing through the flow path; and a control part that controls an opening degree of the flow rate regulating valve based on a measurement result of the flow rate meter, and including: a closing function that controls the opening degree of the flow rate regulating valve with an instantaneous flow rate value and closes with a set accumulated flow rate value; and an accumulated value prediction function that monitors the current opening degree of the flow rate regulating valve and the instantaneous flow rate value all the time, and starts a closing operation of the flow rate regulating valve at a time point when the accumulated flow rate value reaches an early closing flow rate value defined by following mathematical expression.

<Mathematical Expression>

Early closing flow rate value=set accumulated flow rate value−accumulated over flow rate value Accumulated over flow rate value=fully closing completion time calculated according to the current opening degree×discharge flow rate per unit time calculated according to the instantaneous flow rate value Or Accumulated over flow rate value=flow velocity per unit area calculated according to the instantaneous flow rate value×the integral value of the cross-sectional area of the opening from current opening to completion of fully closing.

For the fully closing completion time, the valve opening varies according to the pressure condition and instantaneous flow rate value. The current valve opening degree is monitored by using a position detection sensor or the like, so that the time until the completion of fully closing can be calculated, and the accumulated over flow rate value can be calculated according to the current valve opening degree by applying the discharge flow rate per unit time of the instantaneous flow rate value thereto, thus the early closing operation conforming to the current state can be performed by comparing with the accumulated flow rate value all the time. Thus, the deviation of the accumulated over flow rate value due to the change of the pressure condition and the change of the instantaneous flow rate value can be eliminated by the early closing operation corresponding to the valve opening degree.

In addition, the flow rate control device of the present disclosure is characterized by including a low flow rate rapid valve opening function that accelerates an outflow of the fluid by forcibly opening the opening degree of the flow rate regulating valve from fully closed degree to a designated opening degree in a state where the opening degree of the flow rate regulating valve is fully closed and an instantaneous flow rate value measured by the flow rate meter is 0 L/min; and an overshoot suppressing function for suppressing the overshoot by making the flow rate control stand by until a preset standby time or a preset flow rate threshold is reached immediately after the low flow rate rapid valve opening function works.

Technical Effect

According to the flow rate control device of the present disclosure, it has the following effect that can complete the closing operation in an accurate accumulated flow rate value with small error relative to the set accumulated flow rate value, by regarding the deviation of accumulated over flow rate value due to the difference of pressure change and instantaneous control flow rate value, forcibly starting at a time when the accumulated flow rate value at the time of starting the closing operation of the flow rate regulating valve is predicted in advance according to the current opening degree and the instantaneous flow rate value (the time point at which the early closing flow rate value is reached).

BRIEF DESCRIPTION OF DRAWINGS

FIG. 5 is a data table for calculating a delay flow rate value and an early closing flow rate value based on the current opening degree and the instantaneous flow rate value in the device.

A LIST OF REFERENCE NUMBERS

Figure 1:
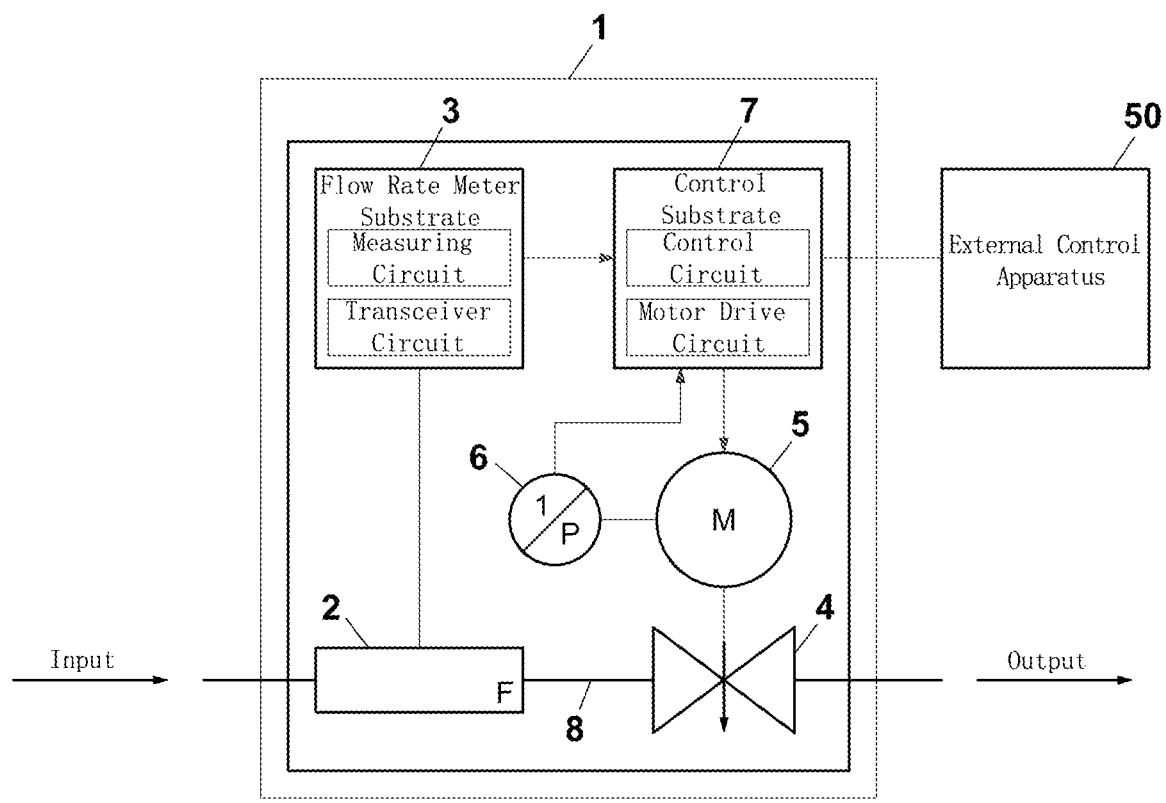
FIG. 1 is a functional block diagram of a flow rate control device of the present disclosure.

1: flow rate control device
2: flow rate meter
3: flow rate meter substrate
4: flow rate regulating valve
5: stepping motor
6: position detection sensor
7: control substrate
8: flow path
9: PFA tube
10: inflow port
11: outflow port
12: measuring pipe
13: ultrasonic sensor
14: ultrasonic sensor
15: valve body
16: diaphragm
17: needle
18: motor actuator
19: shaft body
20: motor shaft
21: spring member
22: valve seat
23: connector substrate
24: I/O connector
25: communication connector
26: magnet
50: external control apparatus

DETAILED DESCRIPTION

In the following, reference to the drawings will be made to explain the way of implementing the present disclosure.

As shown in FIG. 1, a flow rate control device 1 of the present embodiment is a device that integrates a flow rate measuring part and a flow rate control part, and is constructed to comprise a flow rate meter 2, a flow rate meter substrate 3 as the flow rate measuring part, to comprise a flow rate regulating valve 4, a stepping motor 5, a position detection sensor 6 and a control substrate (control part) 7 as the flow rate control part. The control substrate 7 is connected with an external control apparatus 50, and performs the power supply and/or receiving and transmitting of various signals from the external control apparatus 50.

Figure 2:
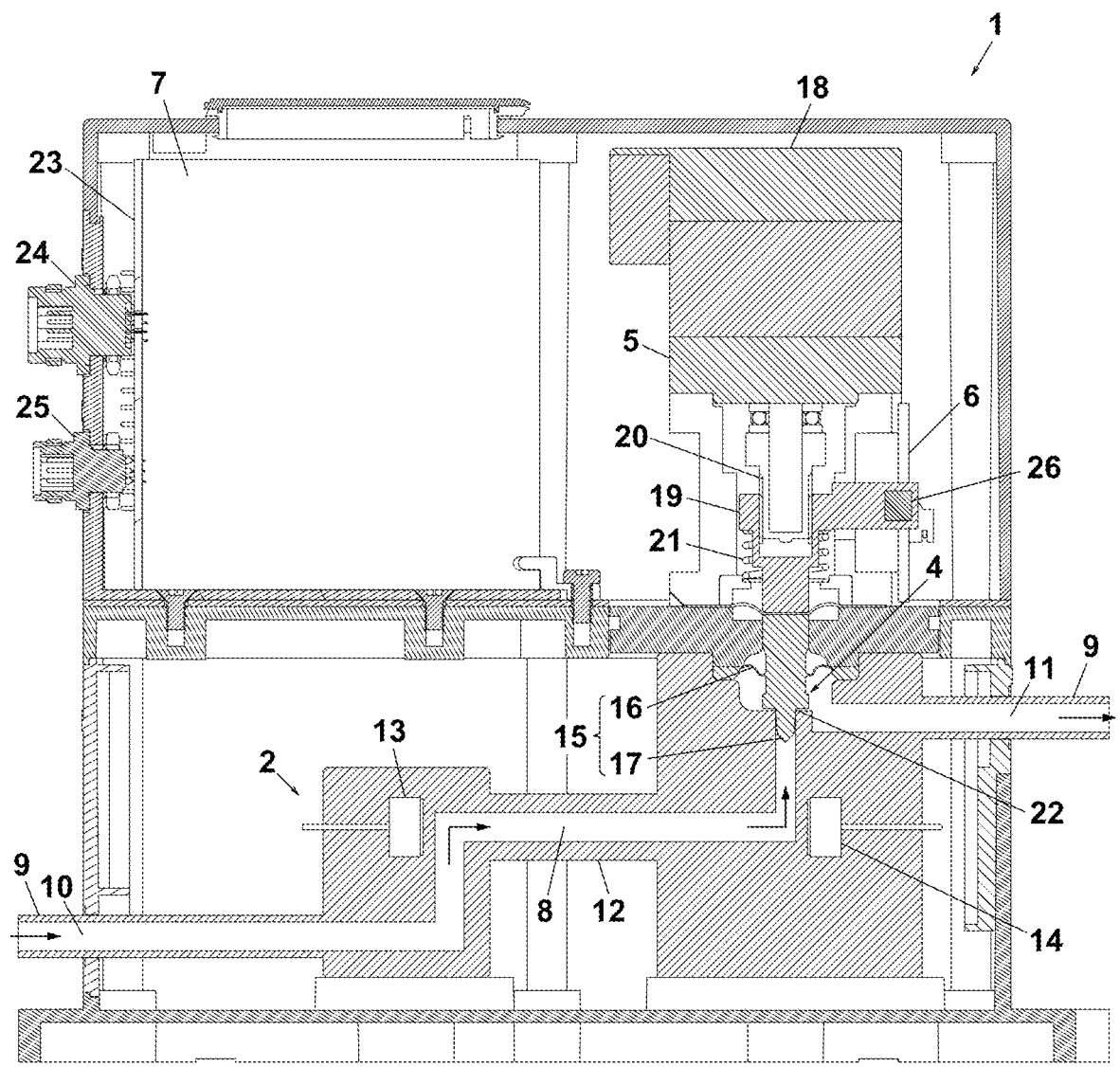
FIG. 2 is an internal structure view of the device.

The flow rate meter 2 measures a flow rate of fluid flowing through a flow path 8. As shown in FIG. 2, the flow rate meter 2 of the present embodiment is an ultrasonic flow rate meter, and is provided with a straight pipe-type measuring pipe 12 in a middle way of the flow path 8 connected to an outflow port 11 from an inflow port 10 on which a PFA tube 9 is mounted. Ultrasonic sensors 13 and 14 consisting of a pair of opposite ultrasonic oscillators are mounted at both ends of the measuring pipe 12. The ultrasonic sensors 13, 14 are alternately switched as a transmitter and a receiver, ultrasonic waves transmitted from one ultrasonic sensor 13 (14) are received by another ultrasonic sensor 14 (13) with respect to the fluid flowing in the measuring pipe 12, so as to measure the flow rate of the fluid based on the difference between the propagation time of the forward ultrasonic wave of the fluid and the propagation time of the reverse ultrasonic wave.

The flow rate meter substrate 3 comprises a transceiver circuit and a measuring circuit. The transceiver circuit excites the ultrasonic oscillator according to a command signal from the measuring circuit, and transmits and receives an ultrasonic pulse generated by the ultrasonic sensors 13 and 14. The measuring circuit has an arithmetic processing part such as a CPU (Central Processing Unit), measures the propagation time required from the transmission of the ultrasonic pulse generated by the ultrasonic sensors 13, 14 to the reception of the ultrasonic pulse, calculates a flow velocity based on the difference between the forward propagation time and the reverse propagation time of the fluid, and converts the calculated flow velocity into a flow rate value (instantaneous flow rate value, accumulated flow rate value) and outputs to the control substrate 7.

The flow rate regulating valve 4 regulates the flow rate of the fluid flowing through the flow path 8. As shown in FIG. 2, the flow rate regulating valve 4 of the present embodiment is an electric needle valve capable of adjusting the opening degree from fully closed degree (0%) to fully open degree (100%). The electric needle valve comprises a diaphragm 16 and a needle 17 as a valve body 15, and comprises a motor actuator 18 including the stepping motor 5 as a driving part. The valve body 15 is connected with a shaft body 19, and the shaft body 19 is mounted with a motor shaft 20 of the stepping motor 5 at a rear end thereof, performs a linear motion operation by suppressing a rotational force on a side surface of the shaft body 19, and is always urged rearward (in a direction away from a valve seat 22) by a spring member 21.

Regarding the flow rate regulating valve 4, if the stepping motor 5 is rotated so that the motor shaft 20 is rotated by the drive of the motor actuator 18, then the shaft body 19 advances against the urging force of the spring member 21 by driving force of the motor shaft 20, and the valve body 15 connected to the shaft body 19 approaches the valve seat 22. In addition, if the stepping motor 5 is rotated reversely so that the motor shaft 20 is rotated reversely by the drive of the motor actuator 18, then the shaft body 19 is pushed back by the urging force of the spring member 21, and the valve body 15 connected to the shaft body 19 separates from the valve seat 22. Thus, the needle 17 of the valve body 15 is driven by the motor actuator 18 to approach the valve seat 22 or separate from the valve seat 22, thereof the valve opening degree which is the gap between the needle 17 and the valve seat 22 is adjusted. It should be noted that the motor actuator 18 comprises a reducer, a position detection sensor 6, in addition to the stepping motor 5.

On the control substrate 7, the external control apparatus 50 is connected to an I/O connector 24 and a communication connector 25 provided on a connector substrate 23 shown in FIG. 2 via an I/O connector cable and a communication connector cable not shown. The control substrate 7 receives a power supply from the external control apparatus 50, and receives and transmits various signals from/to the external control apparatus 50. A signal received from the external control apparatus 50 is a power input signal, a command input signal for setting a target value, a control input signal for controlling ON/OFF, and so on, and a signal transmitted to the external control apparatus 50 is a flow rate output signal.

The control substrate 7 comprises a control circuit and a motor drive circuit. The control substrate 7 controls the motor actuator 18 based on the measurement result of the flow rate meter 2, and performs feedback control (PID control) on the opening degree of the flow rate regulating valve 4. The control circuit has a computing processing part such as a CPU, and outputs a pulse signal of a rectangular wave for controlling the stepping motor 5 to the motor driving circuit based on a flow rate value (instantaneous flow rate value, accumulated flow rate value) received from the flow rate meter substrate 3 and a command input signal received from the external control apparatus 50. In addition, the control circuit causes the position detection sensor 6 to detect a magnetic force using a magnet 26 mounted to the shaft body 19 of the stepping motor 5, and detects the position of the shaft body 19 of the stepping motor 5 based on a voltage signal from the position detection sensor 6. The motor driving circuit generates and outputs an excitation signal according to a pulse signal output from the control circuit, thereby controlling the driving of the stepping motor 5.

The above is the construction of the flow rate control device 1 according to the present embodiment. Next, a flow rate control operation performed by the device will be described with reference to FIG. 3 to FIG. 9.

Figure 3:
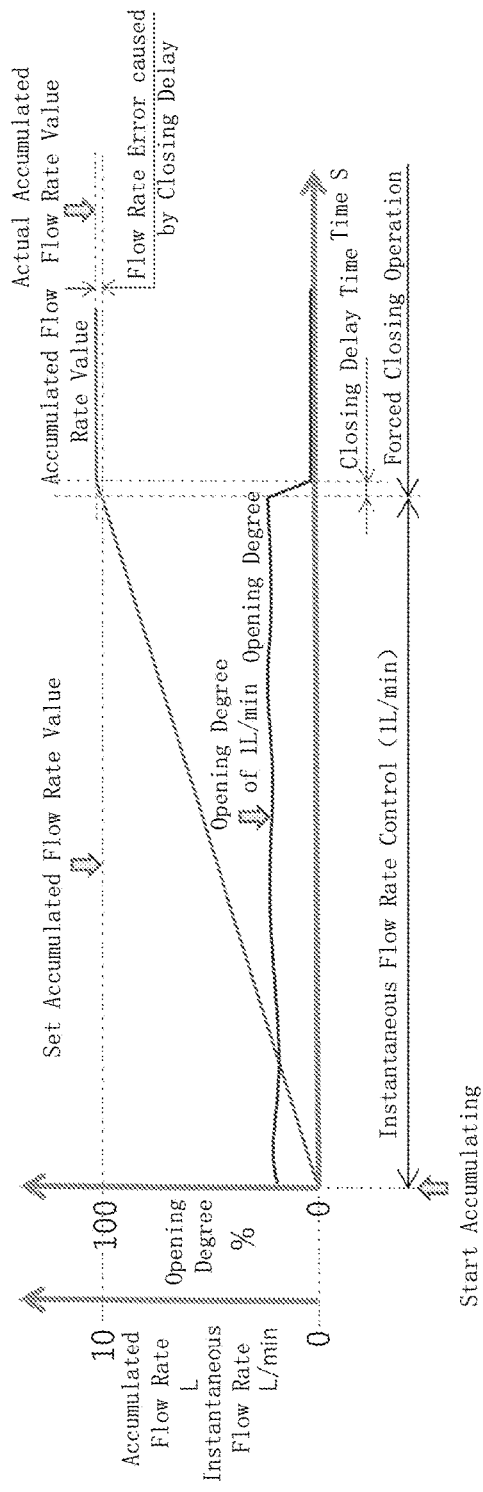
FIG. 3 shows a graph showing the relationship between the opening degree and the accumulated flow rate value when the flow rate control is performed at the instantaneous flow rate value of 1 L/min when the set accumulated flow rate value is 10 L in the device (A), and a graph showing the relationship between the opening degree and the accumulated flow rate value when the flow rate control is performed at the instantaneous flow rate value of 5 L/min when the set accumulated flow rate value is 10 L in the device (B).
Figure 3:
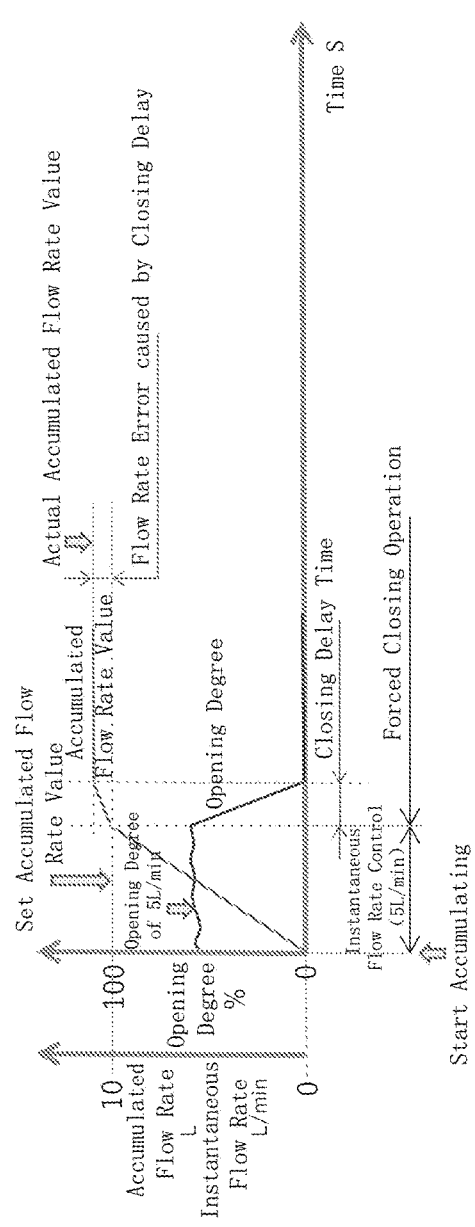

The flow rate control device 1 of the present embodiment provides feedback control (PID control) for the opening degree of the flow rate regulating valve 4 with the instantaneous flow rate value and has a closing function of closing with the accumulated flow rate value set by the external control apparatus 50. Here, for example, a case where the fluid is accumulated in the control substrate (control part) 7 from a state in which the fluid is flowing in the flow path 8 is considered. In FIG. 3, when the set accumulated flow rate value is 10 L, (A) of FIG. 3 is a graph showing the relationship between the opening degree and the accumulated flow rate value when the flow rate is controlled at the instantaneous flow rate value of 1 L/min, and (B) of FIG. 3 is a graph showing the relationship between the opening degree and the accumulated flow rate value when the flow rate is controlled at the instantaneous flow rate value of 5 L/min.

In the case of normal flow rate control, while instantaneous flow rate control is performed, a forced closing operation is started at a time point when the measured accumulated flow rate value reaches a preset accumulated flow rate value, however, as can be seen from FIG. 3, the closing delay time varies according to the opening degree immediately before the forced closing, and there is a tendency that the accumulated flow rate value error becomes larger if the opening degree is high. In addition, it can be seen that the flow rate error caused by the closing delay is different depending on the different instantaneous flow rate value (1 L/min, 5 L/min) at the time of the flow rate control.

Figure 4:
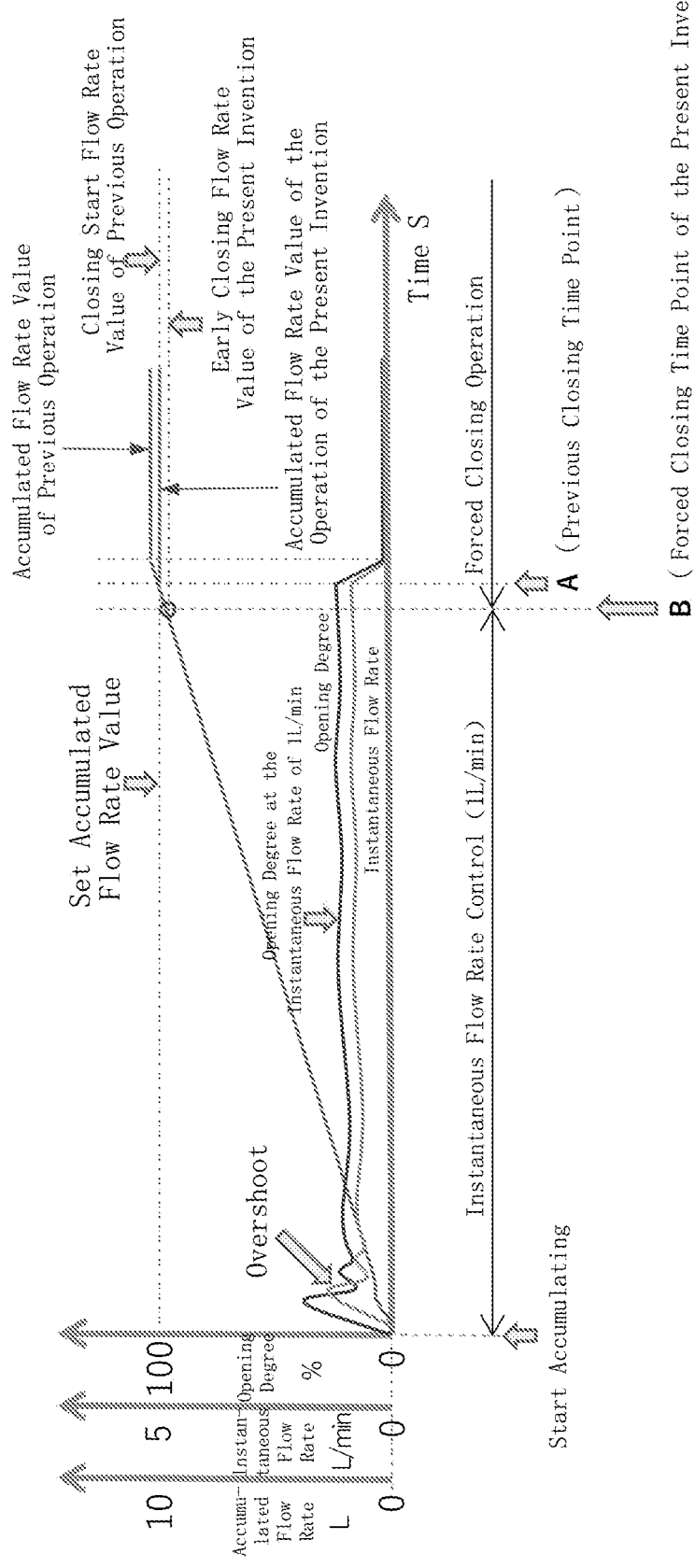
FIG. 4 is a graph showing the relationship between the opening degree and the accumulated flow rate value when the flow rate control is performed at the instantaneous flow rate value of 1 L/min from 0 L when the set accumulated flow rate value is 10 L in the device.

Although in FIG. 3 a case where accumulation starts in a state in which the fluid is flowing during the flow rate control based on the instantaneous flow rate value is described, there are many use examples in which accumulation starts from 0 L when the fluid is not flowing. FIG. 4 is a graph showing a relationship between the opening degree and the accumulated flow rate value in the case of the flow control being performed at the instantaneous flow rate value of 1 L/min, from the state in which the opening degree of the flow rate regulating valve 4 is fully closed (0%) and the instantaneous flow rate value measured by the flow rate meter 2 is 0 L/min, when the set accumulated flow rate value is 10 L.

As shown in FIG. 4, Although in the past, a closing operation is started at a time point when the measured accumulated flow rate value reaches the preset accumulated flow rate value (point A of FIG. 4), however, in the present disclosure, the forced closing operation is started in advance by predicting the reached accumulated flow rate value (point B in FIG. 4), so that the accumulated flow rate value does not easily exceed, and the accumulated flow rate value can be controlled with high accuracy. According to the forced closing start flow rate value of the present disclosure, the closing operation is forcibly started at a time at which the accumulated flow rate value, when the closing operation will be started, was predicted in advance according to the opening degree and the instantaneous flow rate value, thus the closing operation can be completed with an accurate accumulated flow rate value with small error with respect to the set accumulated flow rate value.

That is, the flow rate control device 1 of the present embodiment has a function of monitoring the current opening degree of the flow rate regulating valve 4 and the instantaneous flow rate value all the time, and starting the closing operation of the flow rate regulating valve 4 at a time point when the measured accumulated flow rate value reaches the forced closing start flow rate value, in other words, the early closing flow rate value. This is the accumulated value prediction function.

The early closing flow rate value is defined by the following <mathematical expression >.

<Mathematical Expression >

Early closing flow rate value=set accumulated flow rate value−accumulated over flow rate value Accumulated over flow rate value=fully closing completion time calculated according to the current opening degree×discharge flow rate per unit time calculated according to the instantaneous flow rate value(×the first closing correction coefficient)

It should be noted that the first closing correction coefficient is a coefficient performing correction for a valve that closes while throttling, such as needle valve or ball valve whose opening area changes from the valve closing to the full closing, and is calculated according to an experimental evaluation or a volume ratio of the valve to a throttle orifice.

Alternatively, the following <mathematical expression > can be used instead of the above <mathematical expression >.

<Mathematical Expression >

Early closing flow rate value=set accumulated flow rate value−accumulated over flow rate value Accumulated over flow rate value=flow velocity per unit area calculated according to the instantaneous flow rate value×the integral value of the cross-sectional area of the opening from the current opening to the completion of fully closing(×the second closing correction coefficient)

It should be noted that the second closing correction coefficient is a coefficient for correcting a variation in pressure difference caused by the closing operation and/or a variation in the average flow velocity caused by the viscous influence, and for correcting a variation in the cross-sectional area of the opening due to the shape of the throttle part, which is different from that of calculation, and is calculated by an experimental evaluation or the like.

FIG. 5 is a data table for calculating an accumulated over flow rate value=a delay flow rate value (mL) (FIG. 5) and an early closing flow rate value (mL) based on a fully closing completion time [ms] calculated from a current opening degree (%) of the flow rate regulating valve 4 and a discharge flow rate (mL/ms) per unit time [1 ms] calculated from the instantaneous flow rate value. The current opening is 10% scale, and the middle is calculated by ratio. In addition, the accumulation unit varies according to the scaling value.

For example, when the flow rate is controlled at a set accumulated flow rate value of 1000 mL and an instantaneous flow rate value of 300 mL/min, if the current opening degree is 70%, the fully closing completion time calculated from the opening degree is 180 ms. In addition, since the discharge flow rate during 1 ms calculated from the instantaneous flow rate value of 300 mL/min is 0.005 ml, the delay flow rate value becomes 180 ms×0.005 ml=0.90 ml. Therefore, the early closing flow rate value becomes 1000 mL−0.90 mL=999.10 mL. The control substrate (control part) 7 controls the driving of the motor actuator 18 so as to start the closing operation of the flow rate regulating valve 4 at a time point when the accumulated flow rate value measured by the flow rate meter 2 reaches the early closing flow rate value. As shown in the data table, the current opening degree and the flow velocity are calculated in real time in the control substrate (control part) 7.

Figure 6:
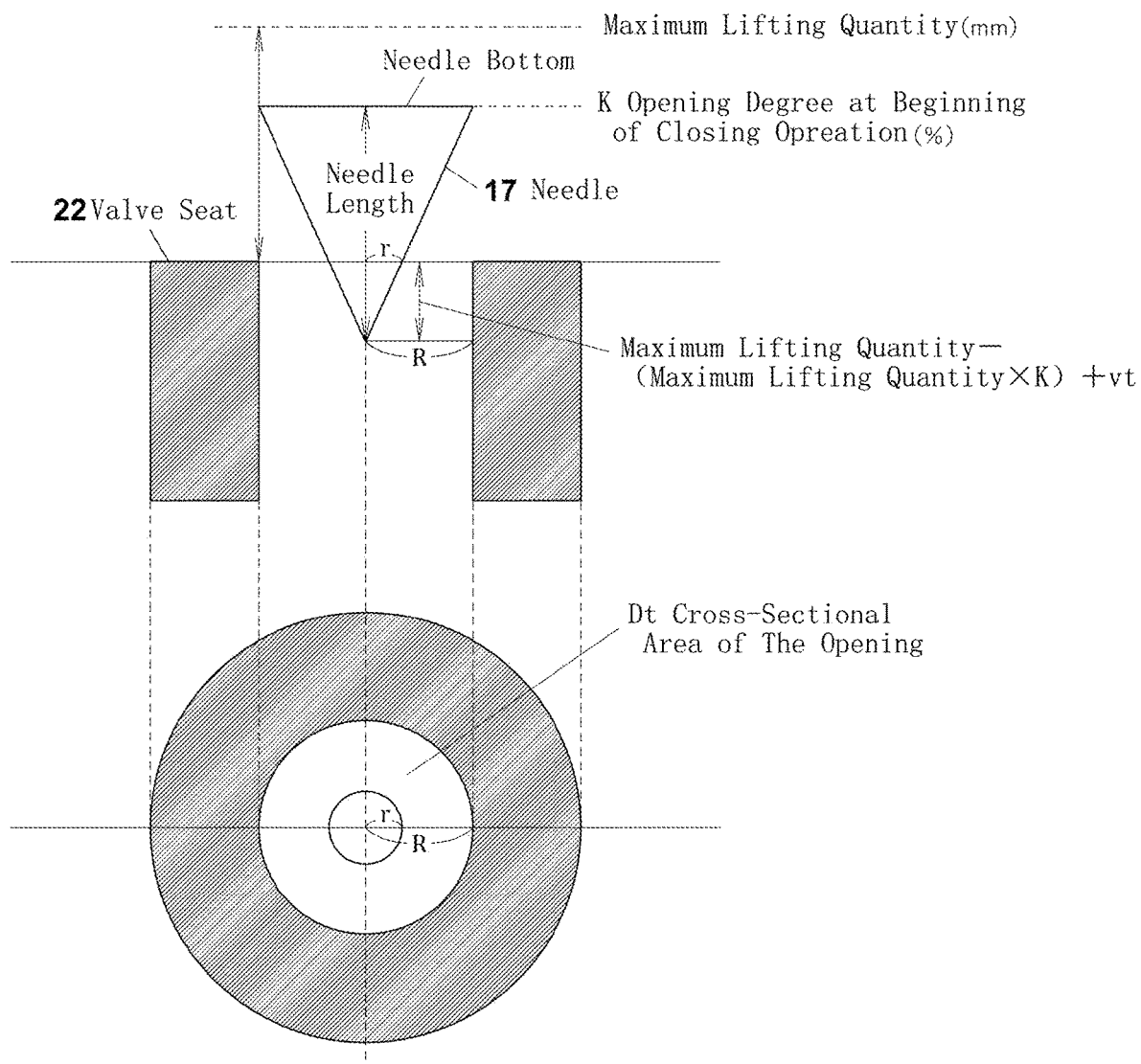
FIG. 6 is a schematic diagram of a needle and a valve seat in the flow rate regulating valve of the device.

The flow rate regulating valve 4 of the present embodiment is an electrically operated needle valve, if the needle 17 and the valve seat 22 are schematically represented as in FIG. 6, a calculation formula for calculating the early closing flow rate value in the accumulated value prediction function is shown as follows.

Calculating the radius r from the current opening degree to t seconds after the beginning of the closing operation $r = a \times (\text{maximum lifting quantity} - \text{maximum lifting quantity} \times K + vt)$ a=needle bottom radius/needle length
v=needle lifting speed
K=opening degree at the beginning of the closing operation (%)

Calculating the opening cross-sectional area Dt after t seconds $Dt = \pi R^2 - \pi r^2$ R=valve throttle orifice radius
Calculating the instantaneous flow rate value after t seconds $Qt = V \times Dt$ V=flow rate at the beginning of closing=instantaneous flow rate at the beginning of closing/cross-sectional area Dt (calculated at t=0)

Calculating the time from the current opening degree to the completion of closing(t1)

$t1 = \text{maximum lifting quantity} \times K/v$

Calculating the delay flow rate value (Q')
Integrating Qt from t0 (closing start time) to t1 (the closing completion time)

$$Q' = \int_{t0}^{t1} (V \times Dt) dt$$

Early closing flow rate value=set accumulated flow rate value−the delay flow rate value(Q')

It should be noted that in the case of accumulating from 0 L when the fluid does not flow as explained in FIG. 4, an overshoot at the beginning of flow rate control is easy to occur, thus it is preferable to use a function of suppressing the overshoot while improving the responsiveness of the low flow rate domain as follows.

Figure 7:
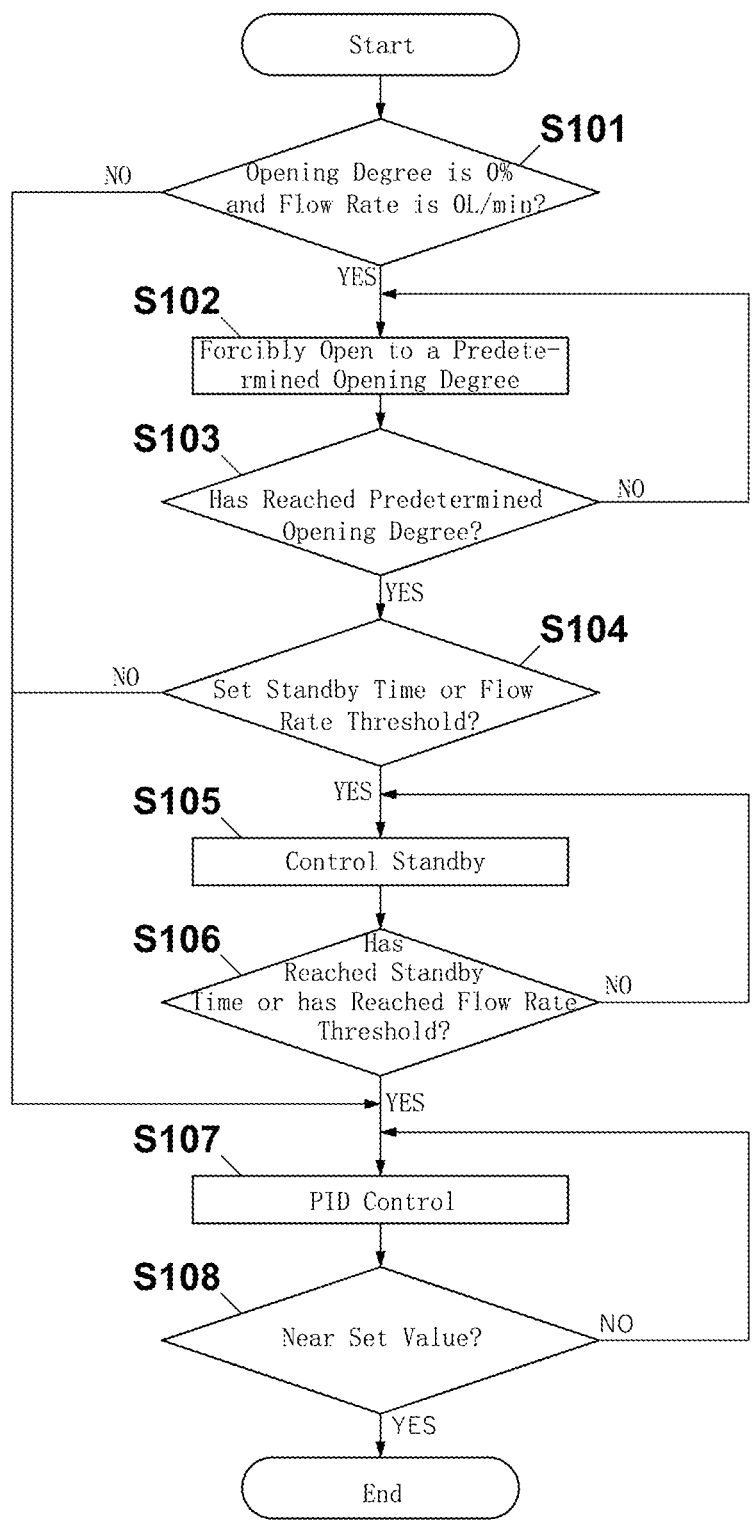
FIG. 7 is a flowchart showing an example of a flow rate control method performed by the device.
Figure 8:
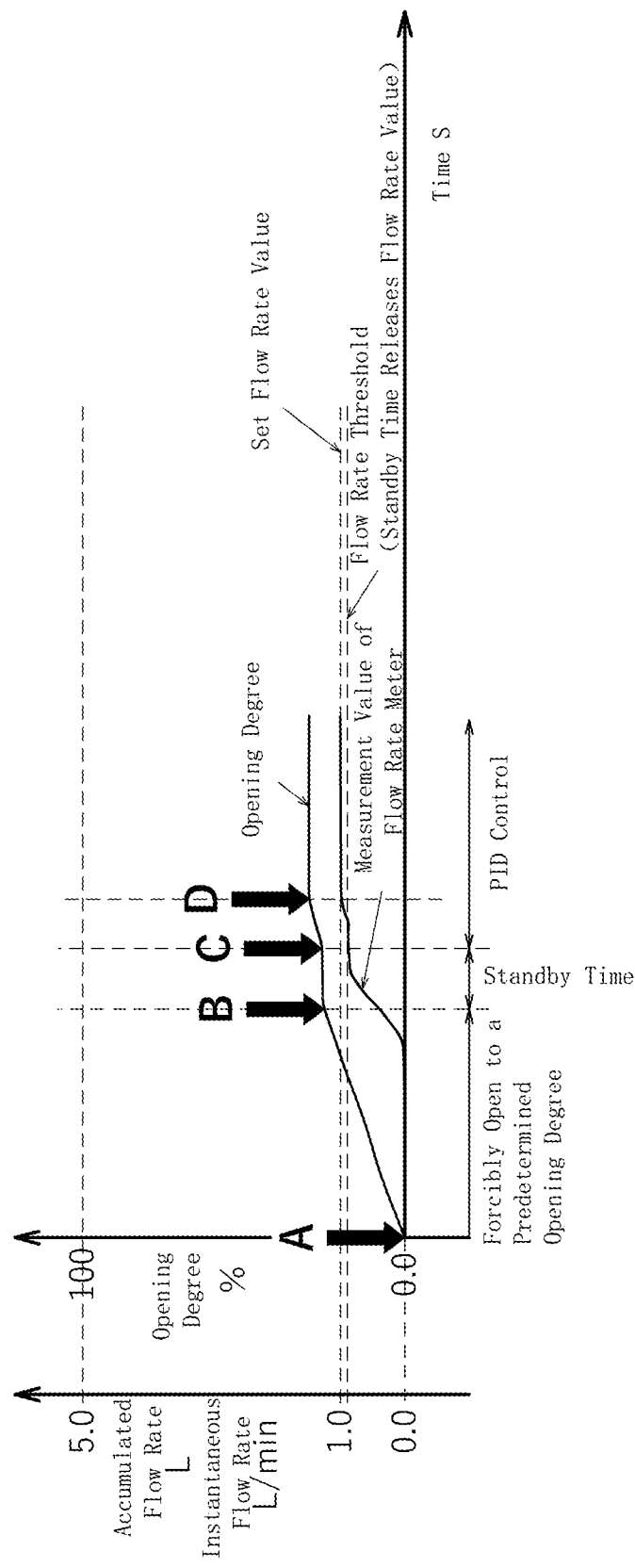
FIG. 8 is a view showing a specific example of the operation performed by the device.

In FIG. 7, in a state where the opening degree of the flow rate regulating valve 4 is fully closed (0%) and the instantaneous flow rate value measured by the flow rate meter 2 is 0 L/min, a flow rate control is started (YES in step 101) (point A in FIG. 8). Although the flow rate control is performed in a direction of a target flow rate setting value, it may be that a PID control is not performed at the time point when the flow rate control is started, and an opening degree command signal is output to forcibly open the opening degree of the flow rate regulating valve 4 from fully closed degree (0%) to a predetermined opening degree (step 102) (point A to point B in FIG. 8). Therefore, a water stop margin of the flow rate regulating valve 4 can be eliminated, and the outflow of the fluid can be accelerated. This process is a low flow rate rapid valve opening function.

When the actual opening degree reaches the predetermined opening degree immediately after the flow rate rapid valve opening function works (YES in step 103), it is determined whether or not a standby time or a flow rate threshold has been set (step 104). Here, when the standby time or the flow rate threshold has not been set (NO in step 104), a normal PID control is started (step 107), but when the standby time or the flow rate threshold has been set (YES in step 104), a control standby is performed without performing the PID control (step 105). That is, the flow rate control will be on standby until the preset standby time or the preset flow rate threshold is reached (point B to point C in FIG. 8). This process is an overshoot suppression function.

By the working of the overshoot suppression function, the standby control is performed continuously until the preset standby time (NO in step 106), and when the flow rate threshold (the standby time releases the flow rate value) has been reached during which (YES in step 106), the control standby will be released, and the normal PID control is started (step 107). In the PID control here, a deviation is calculated by using a saturated flow rate value, thus an appropriate deviation is calculated without mistaken identification, and the opening degree is fine-tuned (from point C to point D in FIG. 8). With this PID control, the flow rate control is continued until a measurement result of the flow rate meter 2 becomes near the set flow rate value (NO in step 108), and if it becomes near the set flow rate value (YES in step 108) (point D in FIG. 8), the flow rate control is terminated.

Thus, by the low flow rate rapid valve opening function, it is possible to improve the responsiveness at the begging of the flow rate control based on the instantaneous flow rate from the flow rate of 0 L. Also, although the overshoot at the beginning of flow rate control generates easily only by the low flow rate rapid valve opening function, the overshoot can be effectively suppressed by combining the overshoot suppression function, thereby controlling standby until the preset standby time or the flow rate threshold is reached immediately after the low flow rate rapid valve opening function works.

Figure 9:
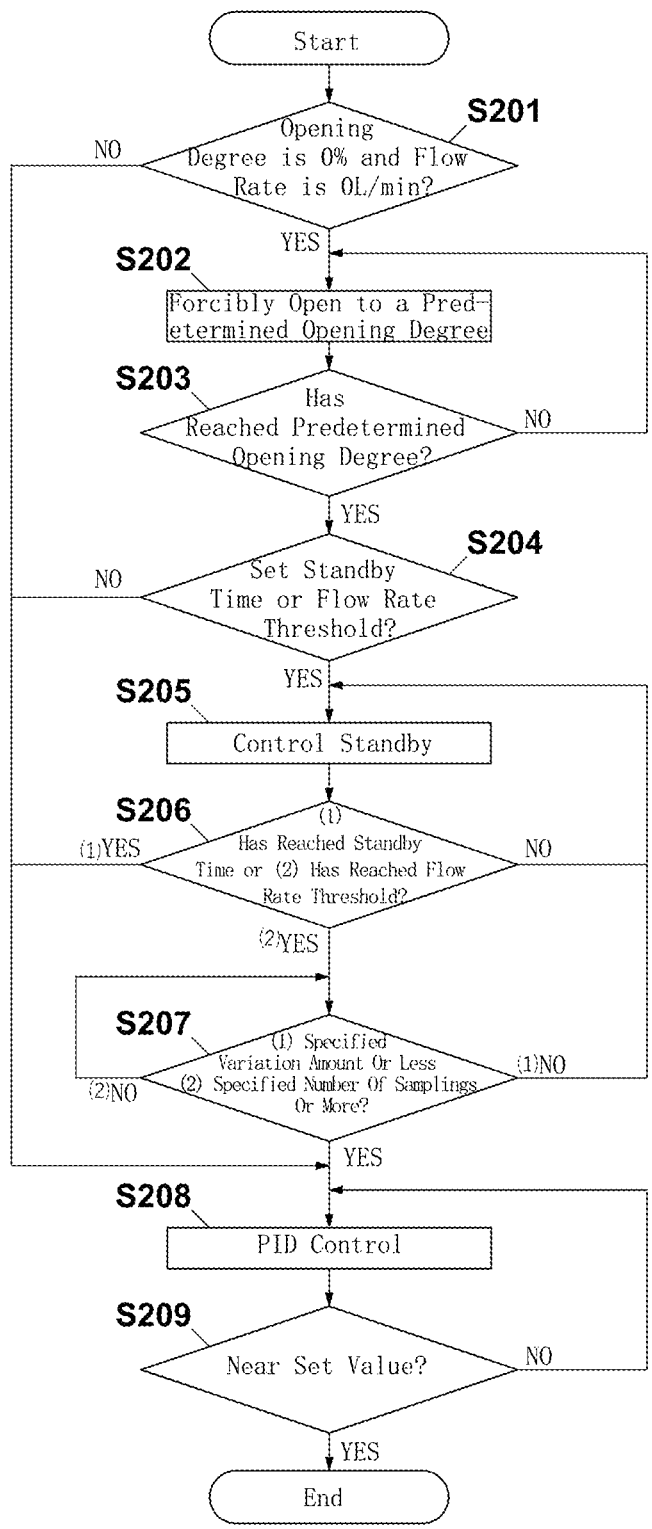
FIG. 9 is a flowchart showing another example of the flow rate control method performed by the device.

It should be noted that the overshoot suppression function can also adopt a controlling method shown in FIG. 9. The processes of steps 201 to 206 shown in FIG. 9 are the same as those of steps 101 to 106 shown in FIG. 7. The difference is that, in step 207, in a case where a specified variation amount or less and a specified sampling times or more are detected (YES in step 106), it is determined that the preset flow rate threshold has been reached and the PID control is started (step 208). Here, "specified sampling times" refers to the number of times of sampling the flow rate measurement and comparing a certain period (for example, 10 ms). In addition, instead of the case where the specified variation amount or less and the specified sampling times or more are detected, in a case where a set flow rate value or more is continuously detected for a plurality of times, it may be determined that the preset flow rate threshold has been reached. By applying such a process, it is possible to prevent erroneous detection due to the influence of pressure variation or the like.

In the embodiments described above, although the ultrasonic flow rate meter is adopted as the flow rate meter 2, the flow rate meter constituting the flow rate measuring part is not limited thereto, and other flow rate meters such as a Karman vortex flow rate meter, an impeller flow rate meter, an area flow rate meter, a Coriolis flow rate meter, a differential pressure flow rate meter, an electromagnetic flow rate meter, and a thermal flow rate meter can be used. In addition, although the electric needle valve is adopted as the flow rate regulating valve 4, the flow rate regulating valve constituting the flow rate control part is not limited thereto, and other valves such as an air needle valve, a constant pressure valve, a ball valve, a butterfly valve, and a globe valve can be used.

What is claimed is:

1. A flow rate control device comprising:
   a flow rate meter that measures a flow rate of a fluid flowing through a flow path;
   a flow rate regulating valve that regulates the flow rate of the fluid flowing through the flow path;
   a control part that controls an opening degree of the flow rate regulating valve based on a measurement result of the flow rate meter; and
   a position detection sensor that detects an opening position of the flow rate regulating valve, wherein the control part includes:
   a closing function that controls the opening degree of the flow rate regulating valve with an instantaneous flow rate value and closes with a set accumulated flow rate value; and
   an accumulated value prediction function that monitors a current opening degree of the flow rate regulating valve and the instantaneous flow rate value all the time, and starts a closing operation of the flow rate regulating valve at a time point when an accumulated flow rate value reaches an early closing flow rate value defined by following mathematical expressions:
   <mathematical expressions> the early closing flow rate value=the set accumulated flow rate value−accumulated over flow rate value; and the accumulated over flow rate value=fully closing completion time calculated according to the current opening degree×discharge flow rate per unit time calculated according to the instantaneous flow rate value, or the accumulated over flow rate value=flow velocity per unit area calculated according to the instantaneous flow rate value×an integral value of a cross-sectional area of an opening from the current opening degree to completion of fully closing time.

2. The flow rate control device according to claim 1, wherein the control part further includes: a low flow rate rapid valve opening function that accelerates an outflow of the fluid by forcibly opening the opening degree of the flow rate regulating valve from fully closed degree to a designated opening degree in a state where the opening degree of the flow rate regulating valve is fully closed and the instantaneous flow rate value measured by the flow rate meter is 0 L/min; and an overshoot suppressing function for suppressing an overshoot by placing the flow rate control device on standby until a preset standby time or a preset flow rate threshold is reached immediately after the low flow rate rapid valve opening function operates.

* * * * *